(12) United States Patent
Khoshkava

(10) Patent No.: US 10,581,343 B2
(45) Date of Patent: Mar. 3, 2020

(54) ELECTRET-BASED ELECTROSTATIC HAPTIC ACTUATOR

(71) Applicant: Immersion Corporation, San Jose, CA (US)

(72) Inventor: Vahid Khoshkava, Montreal (CA)

(73) Assignee: IMMERSION CORPORATION, San Jose, CA (US)

(*) Notice: Subject to any disclaimer, the term of this patent is extended or adjusted under 35 U.S.C. 154(b) by 94 days.

(21) Appl. No.: 15/461,875

(22) Filed: Mar. 17, 2017

(65) Prior Publication Data

US 2018/0269807 A1    Sep. 20, 2018

(51) Int. Cl.

| H02N 1/00 | (2006.01) |
|---|---|
| G06F 3/00 | (2006.01) |
| H02N 2/04 | (2006.01) |
| H02N 2/06 | (2006.01) |
| G06F 3/041 | (2006.01) |

(Continued)

(52) U.S. Cl.
CPC .............. *H02N 1/004* (2013.01); *G06F 3/016* (2013.01); *G06F 3/0414* (2013.01); *H02N 2/04* (2013.01); *H02N 2/06* (2013.01); *A63F 13/285* (2014.09); *G06F 2203/013* (2013.01); *G06F 2203/014* (2013.01); *G06F 2203/015* (2013.01)

(58) Field of Classification Search
CPC ............ H02N 1/00; H02N 1/004; H02N 2/04; H02N 2/06; H04R 19/00; H04R 19/01; H04R 19/013; H04R 1/08; A63F 13/28; A63F 13/285; G06F 3/01; G06F 3/016; G06F 3/04; G06F 3/041; G06F 3/0414; G06F 1/1637; H01G 7/02; H01G 7/028
See application file for complete search history.

(56) References Cited

U.S. PATENT DOCUMENTS

| 7,909,740 B2 | 3/2011 | Dalebout et al. |
|---|---|---|
| 2006/0006759 A1 | 1/2006 | Matsuki |

(Continued)

FOREIGN PATENT DOCUMENTS

EP    1 662 308 A1    5/2006

OTHER PUBLICATIONS

European Search Report dated Sep. 12, 2018 in European Patent Application No. 18 16 2335.

(Continued)

*Primary Examiner* — Tran N Nguyen
(74) *Attorney, Agent, or Firm* — Medler Ferro Woodhouse & Mills PLLC

(57) ABSTRACT

An electret-based haptic actuator is presented. The actuator having an electret layer, an electrically conductive layer, an electrically insulative layer, a plurality of spacers, and a signal generating circuit. The electret layer having a built-in voltage along a thickness dimension of the electret layer. The electrically insulative layer being disposed between the electret layer and the electrically conductive layer. The plurality of spacers being disposed between the electret layer and the electrically conductive layer. The signal generating circuit being electrically connected to the electrically conductive layer and not electrically connected to the electret layer. The signal generating circuit being configured to apply an oscillating drive signal to the electrically conductive layer to generate a vibrotactile haptic effect.

20 Claims, 8 Drawing Sheets

(51) Int. Cl.
*G06F 3/01* (2006.01)
*A63F 13/285* (2014.01)

(56) References Cited

U.S. PATENT DOCUMENTS

| | | | | |
|---|---|---|---|---|
| 2006/0127085 A1* | 6/2006 | Matsuki | ................ | H02N 1/004 |
| | | | | 396/483 |
| 2010/0111335 A1* | 5/2010 | Lee | ..................... | H04R 19/013 |
| | | | | 381/191 |
| 2011/0108838 A1* | 5/2011 | Kageyama | ............ | B06B 1/0292 |
| | | | | 257/49 |
| 2013/0272557 A1* | 10/2013 | Ozcan | ................... | G06F 1/1637 |
| | | | | 381/333 |

OTHER PUBLICATIONS

Partial Search Report dated Jun. 11, 2018 in corresponding European Patent Application No. 18 162 335.6.

* cited by examiner

ELECTRET-BASED ELECTROSTATIC HAPTIC ACTUATOR

FIELD OF THE INVENTION

The present invention is directed to an electret-based electrostatic haptic actuator, and has application in user interfaces, gaming, automotive, wearable devices, and consumer electronics.

BACKGROUND

Electronic device manufacturers strive to produce a rich interface for users. Many devices use visual and auditory cues to provide feedback to a user. In some interface devices, a kinesthetic effect (such as active and resistive force feedback) and/or a tactile effect (such as vibration, texture, and heat) are also provided to the user. Kinesthetic effects and tactile effects may more generally be referred to as "haptic feedback" or "haptic effects". Haptic feedback can provide cues that enhance and simplify the user interface. For example, vibration effects, or vibrotactile haptic effects, may be useful in providing cues to users of electronic devices to alert the user to specific events, or provide realistic feedback to create greater sensory immersion within a simulated or virtual environment.

To generate a haptic effect, many devices use an actuator. Example actuators for generating a haptic effect (also referred to as a haptic actuator) include an electromagnetic actuator such as an eccentric rotating mass ("ERM") actuator and a linear resonant actuator ("LRA"). Other actuators include actuators that use a "smart material," such as a piezoelectric material, an electro-active polymer, or a shape memory alloy.

SUMMARY

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Embodiments hereof relate to a haptic actuator that comprises an electret layer, an electrically conductive layer, an electrically insulative layer, a plurality of spacers, and a signal generating circuit. The electret layer has a built-in voltage along a thickness dimension of the electret layer. The electrically insulative layer is disposed between the electret layer and the electrically conductive layer. The plurality of spacers is disposed between the electret layer and the electrically conductive layer. The signal generating circuit is electrically connected to the electrically conductive layer and not electrically connected to the electret layer. The signal generating circuit is configured to apply an oscillating drive signal to the electrically conductive layer to generate a vibrotactile haptic effect.

In an embodiment, the signal generating circuit is configured to generate the oscillating drive signal at an amplitude that is less than the built-in voltage of the electret layer.

In an embodiment, the amplitude at which the signal generating circuit is configured to generate the oscillating drive signal is less than 1/10th of the built-in voltage of the electret layer.

In an embodiment, the amplitude at which the signal generating circuit is configured to generate the oscillating drive signal is less than 1/100th of the built-in voltage of the electret layer.

In an embodiment, the built-in voltage of the electret layer is in a range of between 1 kV and 10 kV, and the amplitude at which the signal generating circuit is configured to generate the oscillating drive signal is in a range of between 1 V and 10 V.

In an embodiment, the electrically conductive layer or the electret layer has a resonant vibrating frequency, and wherein the signal generating circuit is configured to apply the oscillating drive signal at a frequency that is equal to the resonant vibrating frequency of the electrically conductive layer or of the electret layer, the frequency being in a range of 100 Hz to 500 Hz.

In an embodiment, the electrically insulative layer has a thickness that is in a range of between 100 microns and 1 mm.

In an embodiment, each spacer of the plurality of spacers has a thickness that is in a range of 0.1 mm to 0.5 mm.

In an embodiment, the electret layer and the electrically conductive layer have the same dimensions and each forms a rectangle having four sides, wherein each of the sides of the respective rectangles of the electret layer and the electrically conductive layer is in a range between 2 mm and 20 mm.

In an embodiment, the electrically conductive layer is a first actuating layer, the haptic actuator further comprising a second actuating layer disposed directly or indirectly on the electrically conductive layer.

In an embodiment, the second actuating layer is an electroactive polymer layer electrically connected to a second signal generating circuit.

In an embodiment, each spacer of the plurality of spacers has the form of a microdot.

In an embodiment, the haptic actuator further comprises a second electret layer, a second electrically insulative layer, and a second electrically conductive layer. The second electret layer is disposed on the electrically conductive layer. The second plurality of spacers is disposed on the second electret layer. The second electrically insulative layer is disposed on the second plurality of spacers. The second electrically conductive layer is disposed on the second electrically insulative layer. The signal generating circuit is electrically connected to the second electrically conductive layer and is not electrically connected to the second electret layer.

Embodiments hereof relate to a haptic-enabled device that comprises a housing and a haptic actuator. The housing forms an outer surface of the haptic-enabled device. The haptic actuator is disposed at the outer surface of the haptic-enabled device. The haptic actuator comprises an electret layer having a built-in voltage along a thickness dimension of the electret layer, an electrically conductive layer, an electrically insulative layer disposed between the electret layer and the electrically conductive layer, and a plurality of spacers disposed between the electret layer and the electrically conductive layer. The haptic-enabled device further comprises a signal generating circuit electrically connected to the electrically conductive layer of the haptic actuator and not electrically connected to the electret layer of the haptic actuator. The signal generating circuit is configured to apply an oscillating drive signal to the electrically conductive layer to generate a vibrotactile haptic effect at the outer surface of the haptic-enabled device.

In an embodiment, the haptic-enabled device further comprises a display screen housed in the housing, the display screen also forming the outer surface of the haptic-enabled device. The haptic actuator is disposed on the display screen. The electret layer, the electrically insulative layer, and the electrically conductive layer of the haptic actuator are transparent.

In an embodiment, the haptic-enabled device further comprises a processor communicatively coupled to the electrically conductive layer. The processor is configured to detect a touch input based on a signal or signal change from the electrically conductive layer.

In an embodiment, the signal generating circuit is configured to generate an oscillating drive signal having an amplitude. In this embodiment, the haptic-enabled device further comprises a processor configured to set the amplitude of the oscillating drive signal to be less than $\frac{1}{10}$th of the built-in voltage of the electret layer.

In an embodiment, the processor is configured to set the amplitude of the oscillating drive signal to be less than $\frac{1}{100}$th of the built-in voltage of the electret layer.

In an embodiment, the electrically conductive layer is a first actuating layer, the haptic actuator further comprising a second actuating layer disposed directly or indirectly on the electrically conductive layer. In this embodiment, the haptic-enabled device comprises a second generating circuit configured to apply a second oscillating drive signal to the second actuating layer, and comprises a processor configured to control the signal generating circuit and the second signal generating circuit to cause the oscillating drive signal and the second oscillating signal to have different respective frequencies.

In an embodiment, the second actuating layer is an electroactive polymer layer.

BRIEF DESCRIPTION OF THE DRAWINGS

The foregoing and other features and advantages of the invention will be apparent from the following description of embodiments hereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

DETAILED DESCRIPTION

Figure 1:
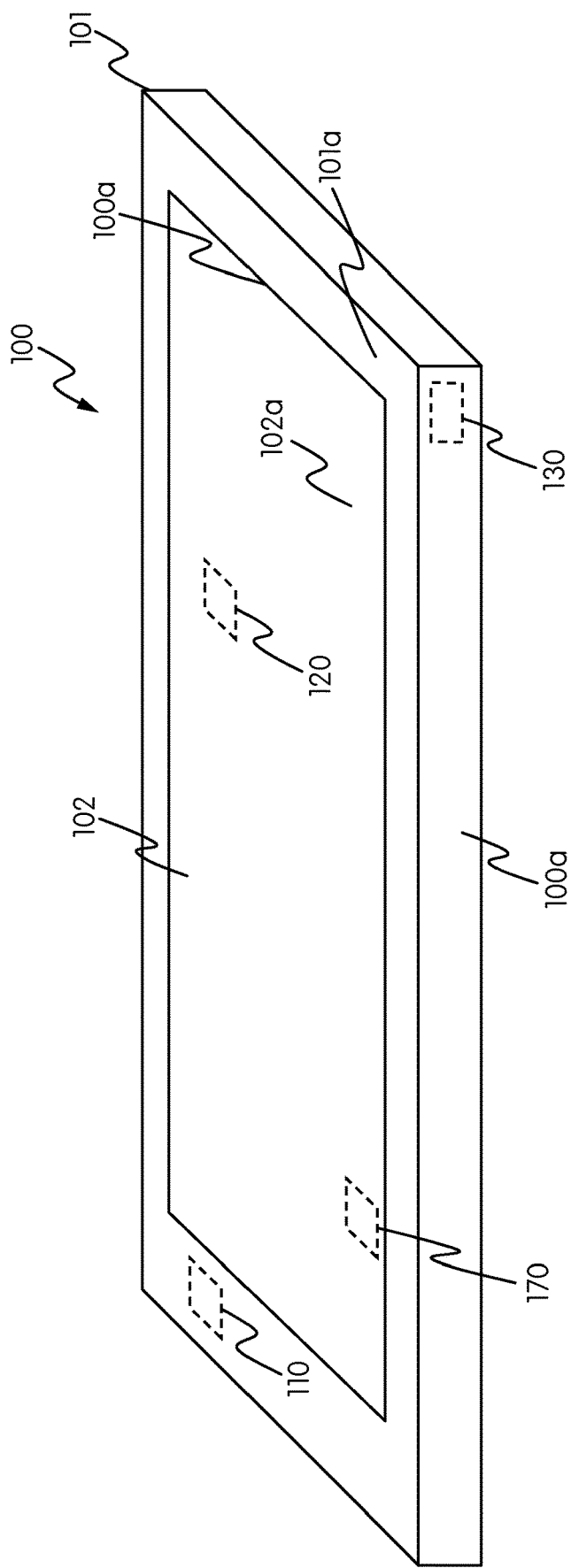
FIG. 1 illustrates a perspective view of a mobile device that includes at least one electret-based haptic actuator, according to an embodiment hereof.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Embodiments hereof relate to an electrostatic haptic actuator that uses an electret layer to generate a vibrotactile or other haptic effect without requiring a high (e.g., 1 kV, 10 kV, or 50 kV) drive signal amplitude. More specifically, an electrostatic haptic actuator may generate a haptic effect based on electrostatic interaction between, e.g., two parallel plates. While this electrostatic interaction can be generated by creating a high voltage (e.g., 1 kV, 10 kV, or 50 kV) between the two parallel plates, generating such a high voltage may involve specialized circuitry and power supplies that increase the cost of the actuator and/or of an electronic device that incorporates the actuator. To provide electrostatic actuation at lower drive signal amplitudes, embodiments hereof relate to a haptic actuator that uses an electret layer as a parallel plate. Such a haptic actuator may function effectively at lower drive signal amplitudes, such as an amplitude no more than 100 V, such as 5V or 10V. The electret layer may have a built-in voltage that is, e.g., on the order of 1 kV, 10 kV, 50 kV, or 100 kV. The electric field associated with the high built-in voltage of the electret layer may interact with an oscillating voltage on another layer, such as an electrically conductive layer. The interaction may be strong enough to generate an effective vibrotactile haptic effect or other type of haptic effect even when the amplitude of the oscillating voltage on the conductive layer is tens or hundreds of times smaller than the built-in voltage of the electret layer.

In an embodiment, the electret layer may be part of an actuator that includes the electrically conductive layer and a plurality of spacers placed between the electret layer and the electrically conductive layer. The conductive layer may be electrically connected to a signal generating circuit that applies an oscillating drive signal (e.g., an oscillating input voltage or oscillating input current) to the conductive layer. The amplitude of the oscillating drive signal may be on the order of, e.g., 1V, 10 V, 50 V, or 100V. In an embodiment, the amplitude of the oscillating signal is not higher than 100 V. This oscillating drive signal (e.g., an alternating current (AC) signal) may create an oscillating electric field that emanates from the conductive layer. The oscillating electric field may interact with a strong electric field arising from the strong built-in voltage and emanating from the electret layer. The interaction may create alternating periods of attraction and repulsion between the electret layer and the conductive layer. As a result, the electret layer and the conductive layer may move relative to each other in an oscillatory fashion that alternates between a period in which the two layers move toward each other and a period in which they move away from each other. The high built-in voltage and electric field of the electret layer may cause an interaction with the conductive layer that is sufficiently strong to provide actuation for a vibrotactile or other haptic effect.

FIG. 1 illustrates a haptic-enabled device 100 that includes one or more haptic actuators, such as a haptic actuator 110, a haptic actuator 120, and a haptic actuator 130. In an embodiment, the haptic-enabled device 100 may be a mobile phone or a tablet computer. In other embodiments, a wearable device (e.g., a head-mounted display for a virtual reality context), game controller (e.g., Wii® remote or smart watch), or other user interface device (e.g., vehicle dash panel) may be the haptic-enabled device. The haptic-enabled device 100 may have a housing 101 that houses a display screen 102 (e.g., touch screen), a processor 170, the haptic actuators 110, 120, 130, and other components of the haptic-enabled device 100. The haptic actuators 110, 120, and 130 may be disposed at an outer surface 100a of the device 100, such as by being on the outer surface 100a or just below the outer surface 100a. The outer surface 100a may include an outer surface 101a of the housing 101 and an outer surface 102a of the display screen 102.

In an embodiment, one or more of the haptic actuators 110, 120, 130 may be attached to the display screen 102, and may be transparent. One or more of the haptic actuators 110, 120, 130 may be behind the outer surface 102a of the screen 102, or may alternatively be in front of (e.g., above) the outer surface 102a of the screen 102. When one of the haptic actuators is behind the screen 102, that actuator may be embedded within the glass or other material of the screen 102. For instance, the actuator may be located just below the outer surface of the screen 102. In this arrangement, the actuator is not able to directly contact a user's finger or other external object. When one of the haptic actuators is disposed in front of the screen 102, the actuator may be attached (e.g., adhered) to the outer surface of the display screen 102. In this arrangement, the actuator may be able to directly contact a user's finger or other external object.

In FIG. 1, some or all of the haptic actuators 110, 120, 130 may be an electret-based haptic actuator. For example, haptic actuator 120 may be an electret-based actuator disposed on or behind (e.g., below) the outer surface 102a of display screen 102, and haptic actuators 120 and 130 may be other electret-based haptic actuators disposed on or behind the outer surface 101a of the housing 101 of the haptic-enabled device 100. In an embodiment, the haptic actuators 110, 120, 130 may be configured to generate vibrotactile haptic effects at different portions of the haptic-enabled device 100.

In an embodiment, each of the haptic actuators 110, 120, 130 may generate a haptic effect upon receiving a haptic drive signal from a signal generating circuit. The haptic actuators 110, 120, 130 may share a signal generating circuit, and/or may be electrically connected to different respective signal generating circuits. If the haptic actuators 110, 120, 130 are configured to share a signal generating circuit, the signal generating circuit may apply the same driving signal to the haptic actuators 110, 120, 130 at the same time, or may switchably apply different driving signals to the haptic actuators 110, 120, 130 in different respective time periods.

In an embodiment, the haptic-enabled device 100 includes a processor 170. The processor 170 may be used to control the haptic actuators 110, 120, 130. The processor 170 may be a general purpose processor for the haptic-enabled device 100 or a specialized processor, such as a digital signal processor or a processing circuit (e.g., field programmable gate array, or FPGA) dedicated to controlling haptic effects. In an embodiment, the processor 170 may control and/or implement the signal generating circuit discussed above.

Figure 2A:
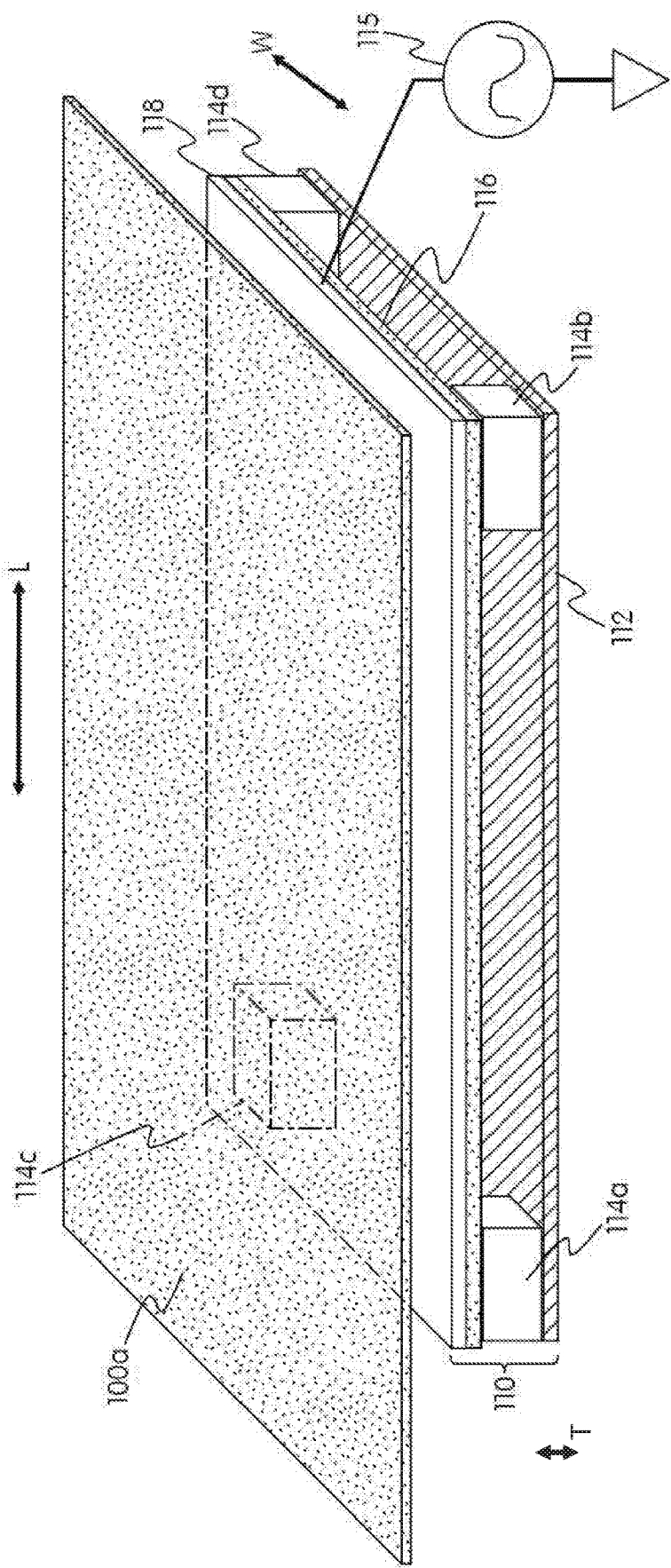
FIG. 2A illustrates a perspective view of an electret-based haptic actuator, according to an embodiment hereof.

FIG. 2A provides a perspective view of a haptic actuator 110 in accordance with an embodiment hereof that is situated below an outer surface 100a of a haptic-enabled device, such as haptic enabled device 100. The haptic actuator 110 includes an electret layer 112, an electrically conductive layer 118, and a plurality of spacers 114a-114d and an electrically insulative layer 116 placed between the electret layer 112 and the electrically conductive layer 118. In an embodiment, the electrically conductive layer 118 and the electrically insulative layer 116 may be part of a bi-layer material that is made of at least electrically conductive material of the layer 118 and the electrically insulating material of the layer 116. In an embodiment, the haptic actuator 110 may be disposed behind the outer surface 100a of the haptic-enabled device 100. For instance, the outer surface 100a may comprise a thin, flexible electrically insulative layer disposed directly over the haptic actuator 110, such that the outer surface 100a covers the electrically conductive layer 118. In another instance, the outer surface 100a may be an outer surface of a glass that forms the display screen 102, and may embed the haptic actuator 110. The outer surface 100a may be used to electrically insulate and/or protect the conductive layer 118 from external objects. While FIG. 2A illustrates an electrically insulative layer 116, in another embodiment the haptic actuator may have only the spacers 114a-114d to provide a separation between the electrically conductive layer 118 and the electret layer 112, and have no insulative layer 116.

In an embodiment, the electret layer 112 has a permanent electric field arising from a built-in voltage along a thickness dimension T of the layer 112 (i.e., a dimension along which a thickness of the layer 112 is measured, which may be a dimension extending along a direction perpendicular to the layers). The built-in voltage may have a value that is, e.g., between 100 V and 1 kV, or between 1 kV and 10 kV, or between 10 kV and 100 kV, or greater than 100 kV. In an embodiment, the electrically conductive layer 118 may be, e.g., a thin metal sheet, and the electrically insulative layer 116 may be, e.g., a thin polymer film. In an embodiment, the electret layer 112, the electrically conductive layer 118, and the electrically insulative layer 116 may each form a rectangle having four sides (with two sides along a length dimension L and two sides along a width dimension W). Each of the sides of the respective rectangles may be in a range between 2 mm and 20 mm. In an embodiment, the side along the length dimension L and the side along the width dimension W of a particular layer (e.g., layer 112) may have sizes that are solutions of a multi-physics problem that depends on the size of the layer along the thickness dimension T and the modulus of the layer. That is, the size of the layer along its length dimension L and its width dimension W may affect the layer's electrostatic interaction with another layer, but these values may also, along with the size of the layer along its thickness dimension T and the modulus thereof, affect the stiffness of the layer. The stiffness and the level of electrostatic interaction may affect the strength of the haptic effect that is output. Thus, designing the size of the layer along the length dimension L and the width dimension W may take into account the size of the layer along the thickness dimension T and the layer's modulus, and may balance the resulting mechanical stiffness and level of electrostatic interaction to achieve a desired haptic effect output strength. In an embodiment, each of the layers 112, 116, and 118 may have a thickness that is in a range between 100 microns and 1 mm (i.e., along the thickness dimension T). In an embodiment, the electrically insulative layer 116 may have a thickness of 1 micron or higher. The electret layer 112, electrically insulative layer 116, and the electrically conductive layer 118 may have the same dimensions (and thus the same surface area), or may have different respective dimensions.

In an embodiment, the electrically conductive layer 118 comprises a metal such as copper, aluminum, or a nonconductive material (e.g., plastic or glass) coated with a thin conductive layer (e.g., a gold, indium tin oxide, or conductive nanotube layer), or any combination thereof (e.g., as a metal alloy). In an embodiment, the electrically conductive layer 118 comprises a nonmetallic conductor, such as graphite or a conductive polymer. In an embodiment, the electrically conductive layer 118 may have a conductivity that is at least on the order of $10^7 \sigma$.

In an embodiment, the electrically insulative layer 116 comprises plastic, rubber, an insulating polymer (e.g., polyimide), glass, or any other material having a thin coating of an electrically insulative material, such as silicon dioxide or Parylene™ (poly(p-xylylene)), or any combination thereof. In an embodiment, the electrically insulative material may have a resistivity that is at least on the order $10^{11}$ Ωm.

In an embodiment, the spacers 114a-114d may be used to form a suspension system that creates a space or gap between the electret layer 112 and the conductive layer 118, so as to provide space for the two layers to vibrate relative to each other. Example thicknesses of each of the spacers 114a-114d along the dimension T include 0.1 mm, 0.25 mm, or 0.5 mm. Other embodiments may use no spacers, or a different number of spacers (e.g., three spacers, six spacers). The spacers 114a-114d may be made of an elastic or rigid (i.e., stiff) material, such as a glass bead (for a stiff suspension), VHB™ tape made from an acrylic elastomer, a silicon-based tape, or polyurethane (all for a softer suspension), or any combination thereof. An elastic material may more easily dampen vibrations in the haptic actuator 110, while a rigid material may cause less dampening of vibrations in the haptic actuator 110. The level of elasticity or stiffness at which the spacers 114a-114d are made may depend on a level of natural dampening that is desired in the haptic actuator 110. While FIG. 2A shows the spacers 114a-114d to have a rectangular shape, a spacer may have any other shape that is suitable for the configuration of the actuator. For instance, each of the spacers 114a-114d may instead have the form of a microdot.

In an embodiment, both the electrically insulative layer 116 and the spacers 114a-114d may be used to prevent the electrically conductive layer 118 and the electret layer 112 from directly touching (e.g., from having plate-to-plate contact) and creating a conductive path between each other. Such contact may cause discharging from the electret layer to the electrically conductive layer. In an embodiment, the spacers 114a-114d may provide sufficient separation between the conductive layer 118 and the electret layer 112 to prevent them from touching each other, and thus the electrically insulative layer 116 may be omitted. In an embodiment, a haptic actuator may have additional layers, embodiments of which are discussed below in FIGS. 3 and 4. In addition to the examples below, the haptic actuator may have a layer of adhesive between the other layers (e.g., between electret layer 112 and each of the spacers 114a-114d). In an embodiment, the conductive layer 118, the electret layer 112, the electrically insulative layer 116, and/or the spacers 114a-114d may be transparent, so as to make the haptic actuator 110 transparent. This transparency renders the actuator 110 more suitable for placement at the display screen 102.

FIG. 2A further depicts a signal generating circuit 115 that may be electrically connected to the electrically conductive layer 118 and not electrically connected to the electret layer 112. The signal generating circuit 115 is part of the haptic-enabled device 100 of FIG. 1, and may be part of the haptic actuator 110, or may be a separate component. In an embodiment, the signal generating circuit 115 may be implemented by a processor (e.g., processor 170) of the haptic-enabled device 100. In an embodiment, the signal generating circuit 115 may be configured to apply an oscillating drive signal, such as a sinusoidal signal or square wave, to the electrically conductive layer 118, at an amplitude that is less than the built-in voltage of the electret layer 112, where the amplitude has a nonzero value. For example, the amplitude of the oscillating drive signal may be less than 1/10th of the built-in voltage of the electret layer 112, or less than 1/100th (or 1/1000th) of the built-in voltage of the electret layer 112. In an embodiment, the electrically conductive layer 118 and/or the electret layer 112 has a resonant vibrating frequency, and the signal generating circuit may be configured to apply an oscillating drive signal at a frequency that is equal to the resonant vibrating frequency of the conductive layer or of the electret layer. In an embodiment, the oscillating drive signal may have an amplitude that is in the range, e.g., of 1 V to 10 V (or 10 V to 50 V), and a frequency that is in the range, e.g., of 100 Hz to 500 Hz. In an embodiment, the amplitude of the oscillating drive signal that is generated by the signal generating circuit 115 may be set by processor 170 (or any other control unit) of the haptic-enabled device 100.

Figure 2B:
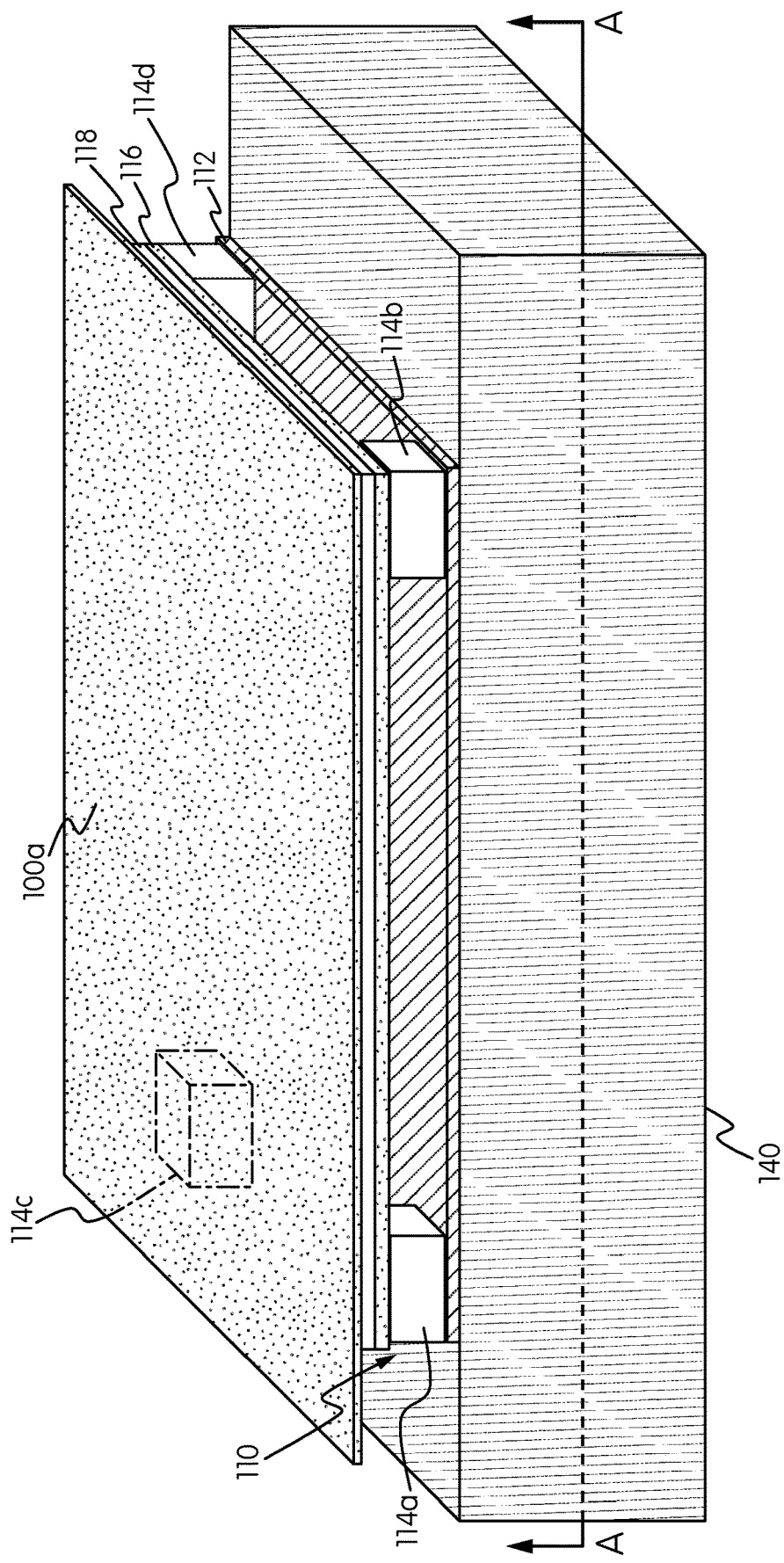
FIG. 2B illustrates a perspective view of the electret-based haptic actuator of FIG. 2A and a substrate layer, according to an embodiment hereof.

FIG. 2B depicts an embodiment in which the electret layer 112 of the haptic actuator 110 of FIG. 2A is attached to a substrate 140 or other support structure of a haptic-enabled device, such as a substrate 140 of the display screen 102 or the housing 101 of the haptic-enabled device 100. The substrate 140 may be considered to be relatively immovable by the haptic actuator 110. The electret layer 112 can be considered to be mechanically grounded, and the electrically conductive layer 118 may be considered to be the actuating layer that vibrates when the haptic actuator 110 is activated. The vibration of the electrically conductive layer 118 may transfer to the outer surface 100a of the haptic-enabled device 100 to create a vibrotactile haptic effect at the outer surface 100a.

In an embodiment, the haptic actuator 110 may be configured to also function as a sensor. For instance, the haptic actuator 110 may sense a user pressing a portion of the outer surface 100a immediately above the haptic actuator 110. When this portion is pressed, the conductive layer 118 may experience a deformation from a user's touch or other form of input. The deformation may generate a voltage or current signal at the conductive layer 118, or modulate an existing voltage or current signal at the layer 118 to cause a signal change. A processor communicatively coupled with the conductive layer 118 (e.g., processor 170) may be configured to detect a touch input based on a signal or signal change from the conductive layer 118 of the actuator/sensor 110.

Figure 2C:
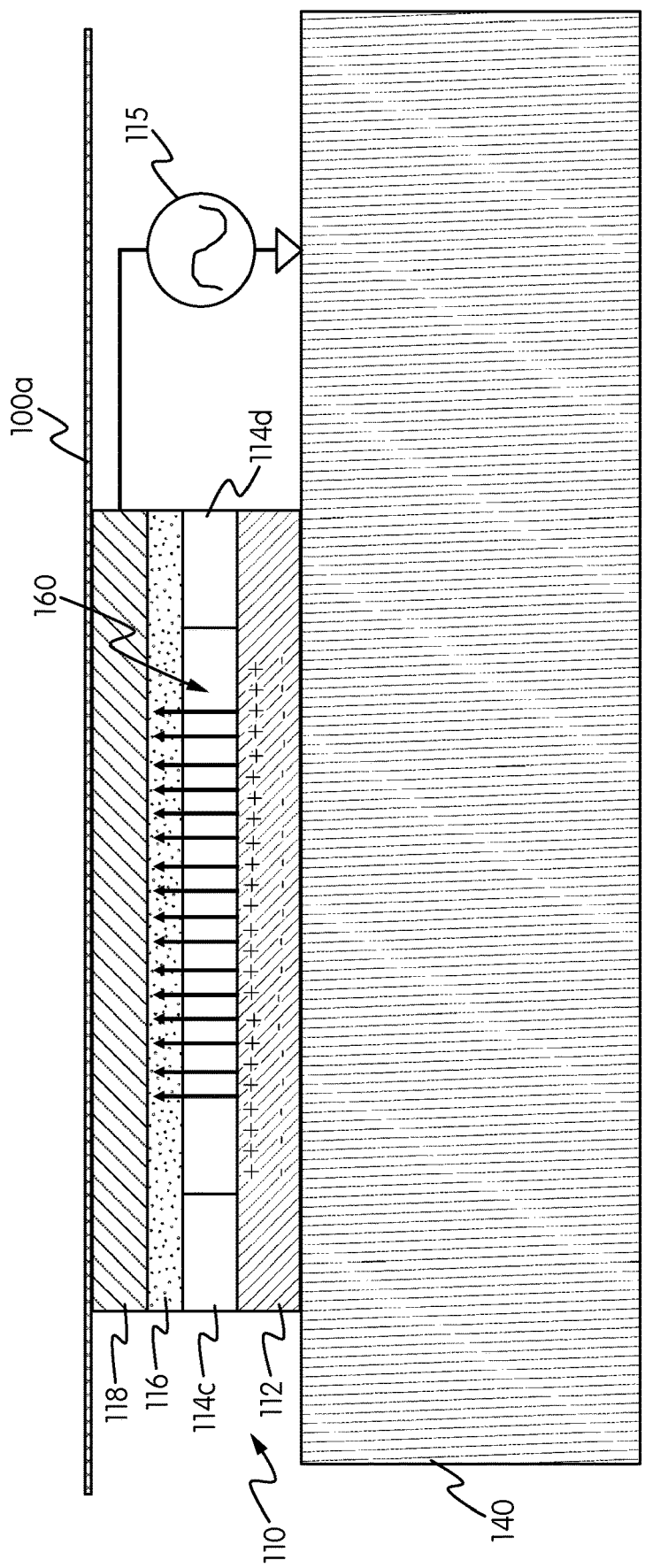
FIG. 2C illustrates a sectional view of the electret-based haptic actuator and the substrate layer of FIG. 2B, according to an embodiment hereof.

FIG. 2C depicts a sectional view of the haptic actuator 110 along the line A-A in FIG. 2B. More specifically, the sectional view shows the outer surface 100a, electrically conductive layer 118, electrically insulative layer 116, spacers 114c, 114d, electret layer 112, and substrate 140. The sectional view further depicts the permanent electric field 160 from the built-in voltage of the electret layer 112. The figure further illustrates the electric field 160 to arise from a quantity of positive charge and a quantity of negative charge, which have been separated in the electret layer 112. The creation of the electret layer 112 and the electric field 160 of the built-in voltage may be created in numerous ways, which are discussed in more detail below.

In FIG. 2C, the substrate 140 may have substantially more mass than the haptic actuator 110, and may be considered to be immovable relative to the haptic actuator 110. Accordingly, the electret layer 112 of the haptic actuator 110 in this embodiment may be considered to be mechanically grounded (i.e., mechanically fixed) by the substrate 140, as discussed above. When a driving signal is applied to the electrically conductive layer 118, the mechanically grounded electret layer 112 may be considered to remain stationary, while the electrically conductive layer 118 is an actuating layer that actuates (e.g., vibrates) relative to the electret layer 112. The actuation (e.g., vibration) may be transferred to the outer surface 100a to create a haptic effect at the outer surface 100a of the haptic-enabled device 100.

In an embodiment, the electrically insulative layer 116 may move in unison with the conductive layer 118.

Figure 3:
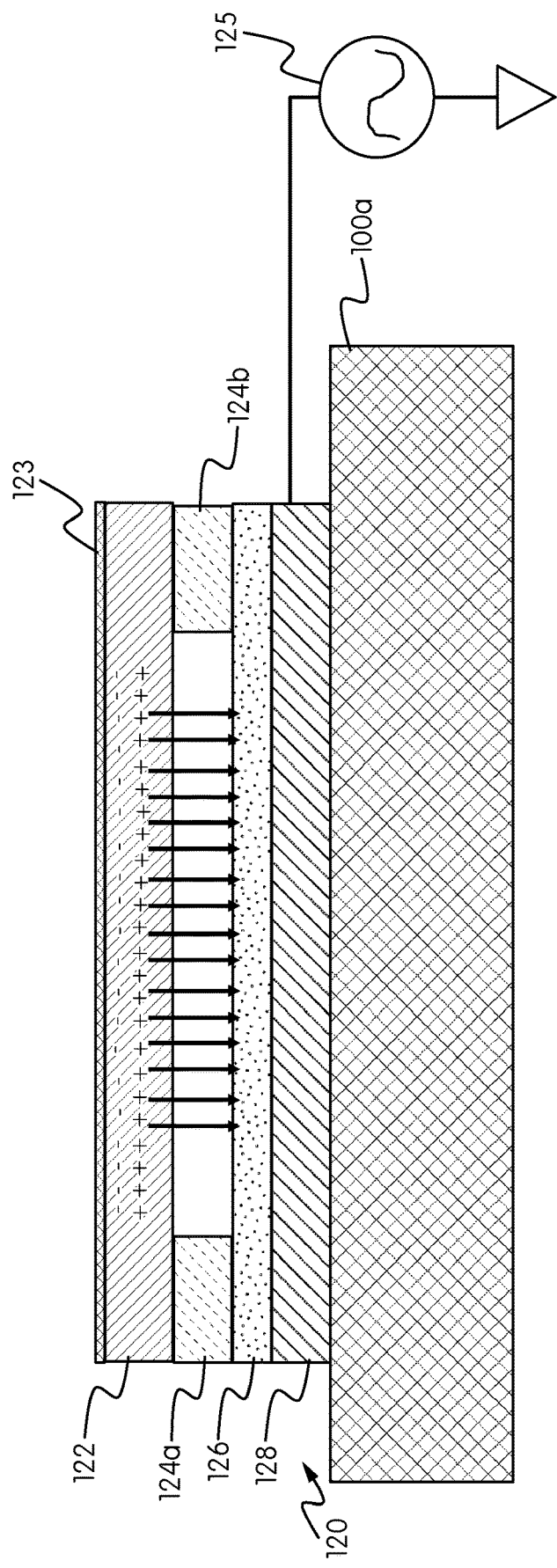
FIGS. 3 and 4 illustrate sectional views of electret-based haptic actuators, according to embodiments hereof.

FIG. 3 depicts a sectional view of a haptic actuator (e.g., haptic actuator 120) in accordance with another embodiment hereof that has an electrically conductive layer as the mechanically grounded layer. Further, the conductive layer may be mounted on an outer surface of a haptic-enabled device, such as the outer surface 100*a* of the haptic-enabled device 100. More specifically, FIG. 3 illustrates a sectional view of a haptic actuator 120 that includes an electrically conductive layer 128, an electrically insulative layer 126, an electret layer 122, and a plurality of spacers (e.g., spacers 124*a*, 124*b*) between the electrically conductive layer 128 and the electret layer 122. In FIG. 3, the haptic actuator 120 further includes a protective layer 123 disposed directly over the electret layer 122. The protective layer 123 may be a layer made of an electrically insulative material or any other type of material to electrically insulate and/or protect the electret layer 122 from a user's finger or other external object. In another embodiment, however, the protective layer 123 may be omitted, and the electret layer 122 or another layer may be exposed to the external environment in order to receive a direct touch from an external object. FIG. 3 further illustrates a signal generating circuit 125 that is electrically connected to the conductive layer 128 and is configured to apply an oscillating drive signal, or any other drive signal, to the conductive layer 128. The signal generating circuit 125 may be part of the haptic actuator 120, or may be an element which is external to the haptic actuator 120.

In the embodiment of FIG. 3, the electrically conductive layer 128 may be the mechanically grounded layer. For instance, the electrically conductive layer 128 may be grounded by being directly attached to the outer surface 100*a*. The outer surface 100*a* may be an outer surface of a glass layer (e.g., of the display screen 102) or of a plastic layer (e.g., of housing 101) that is more massive than the haptic actuator 120, and is configured to be relatively immovable by the haptic actuator 120. When a driving signal from the signal generating circuit 125 is applied to the conductive layer 128, the conductive layer 128 may be considered to be stationary, while the electret layer 122 may be the actuating layer that moves relative to the conductive layer 128. For instance, if an oscillating drive signal is applied to the conductive layer 128, the conductive layer 128 and the electret layer 122 may alternate between being attracted to each other and being repelled by each other. As a result, the electret layer 122 may alternate between moving toward the conductive layer 128 and moving away from the conductive layer 128. This motion may vibrate the electret layer 128, and the vibration may be transferred to the protective layer 123 to create a vibrotactile haptic effect.

Figure 4:
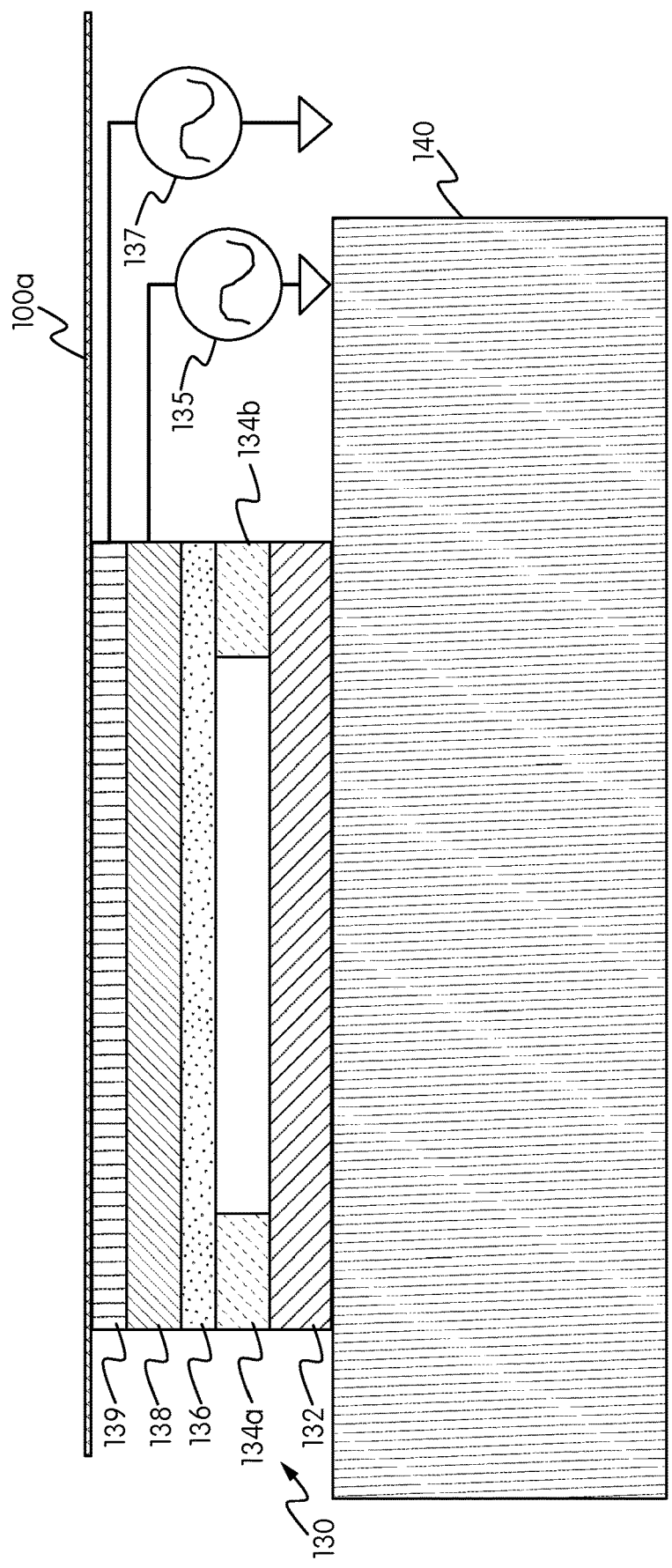

FIG. 4 illustrates a haptic actuator 130 in accordance with another embodiment hereof that may include two actuating layers. More specifically, the haptic actuator 130 includes an electret layer 132 that is mechanically grounded on a substrate 140, a first actuating layer 138 (e.g., a conductive layer), a second actuating layer 139 (e.g., an electroactive polymer layer or piezoelectric layer) disposed (directly or indirectly) on the first actuating layer 138, and an electrically insulative layer 136 and a plurality of spacers (e.g., 134*a*, 134*b*) disposed between the first actuating layer 138 and the electret layer 132. FIG. 4 further depicts a first signal generating circuit 135 that is electrically connected to the first actuating layer 138, and a second signal generating circuit 137 that is electrically connected to the second actuating layer 139. Each of the signal generating circuits 135, 137 may be configured to generate an oscillating drive signal or any other drive signal. The signal generating circuits 135, 137 may be part of the haptic actuator 130, or may be considered to be external to the haptic actuator 130.

The presence of both the first actuating layer 138 and the second actuating layer 139 may also enable more complex haptic effects to be generated, because the first actuating layer 138 and the second actuating layer 139 may, in an embodiment, be driven with different respective oscillating drive signals that have different respective amplitudes, frequencies, and/or phases. For instance, the first signal generating circuit 135 may apply a 100 Hz signal with an amplitude of 5 V to the first actuating layer 138, and the second signal generating circuit 137 may apply a 1 Hz signal with an amplitude of 10 V to the second actuating layer 139. Even if the same oscillating drive signal is applied to the first actuating layer 138 and the second actuating layer 139, the two layers may move differently if they are made of different materials. For instance, the first actuating layer 138 may be an electrically conductive layer that relies on electrostatic interaction with the electret layer 132 to generate a haptic effect, while the second actuating layer 139 may be an electroactive polymer layer. In an embodiment, the first actuating layer 138 may be used to generate a vibrotactile haptic effect, while the second actuating layer 139 may be used to generate a more general deformation-based haptic effect.

Figure 5A:
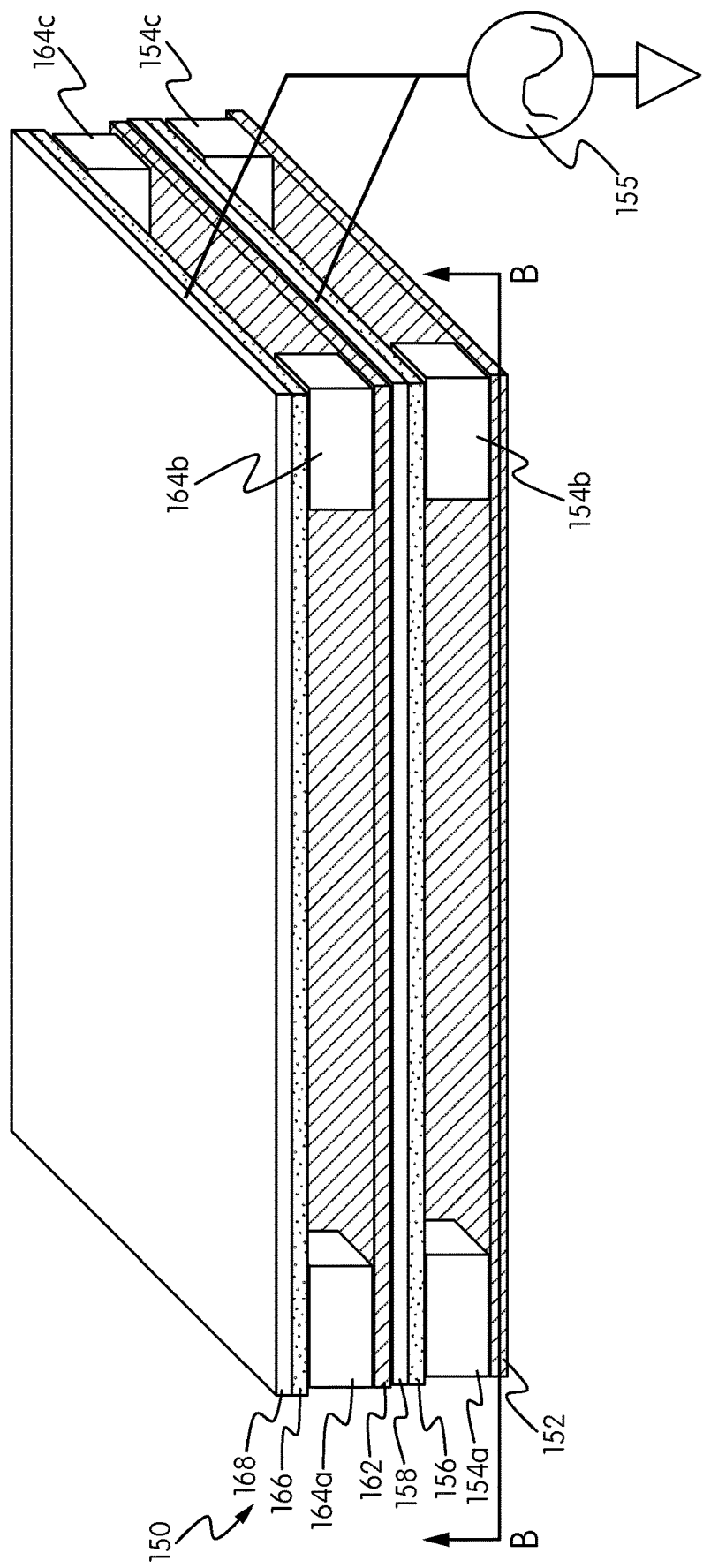
FIGS. 5A and 5B illustrate a perspective view and a sectional view, respectively, of an electret-based haptic actuator, according to an embodiment hereof.
Figure 5B:
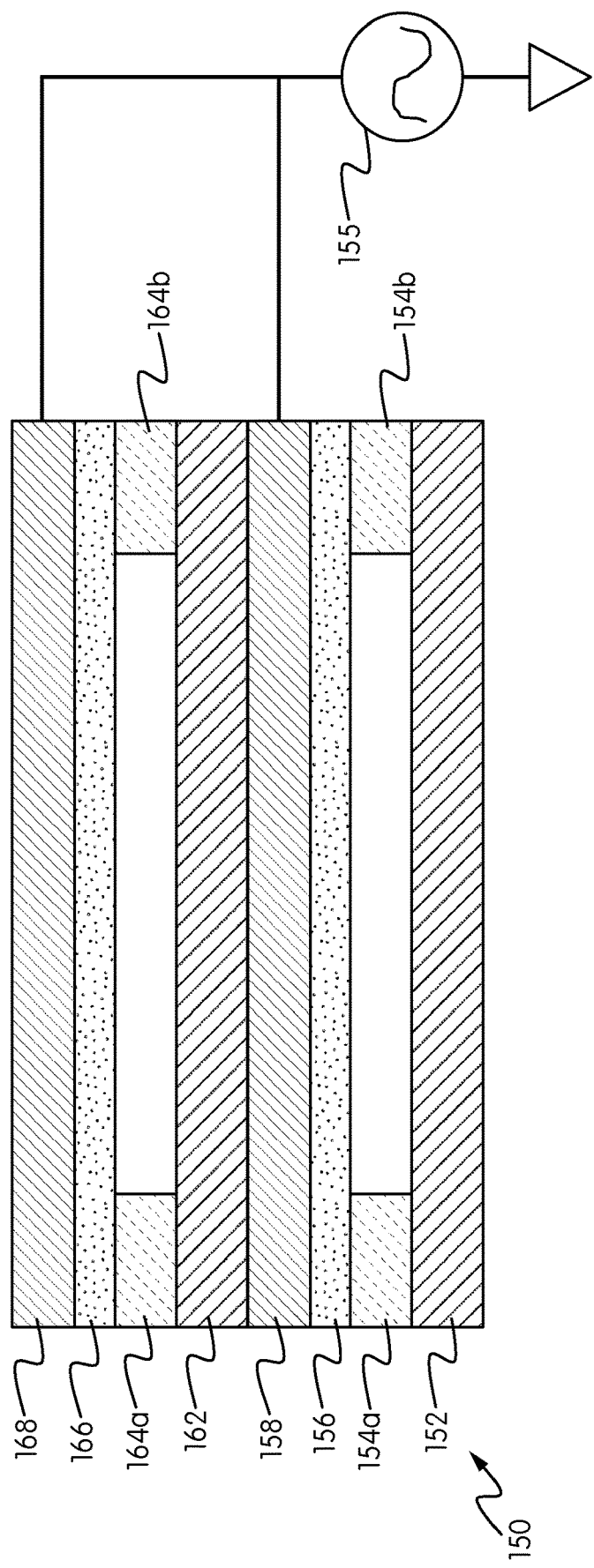

FIGS. 5A and 5B illustrate a perspective view and a sectional view of a haptic actuator 150 in accordance with another embodiment hereof that includes a first set of layers 152, 156, 158 and a second set of layers 162, 166, 168, in which the second set of layers 162, 166, 168 are stacked on the first set of layers 152, 156, 158. Both sets of the first set of layers 152-158 and the second set of layers 162-168 may be the same layers 112, 116, 118 as those of the haptic actuator 110 in FIG. 2A. A haptic actuator with two or more stacked sets of layers may be able to increase its actuation output (e.g., in rate or amount of displacement) compared to a haptic actuator with only one set of layers. In an embodiment, the motion of the two sets of layers may be synchronized by applying the same drive signal (e.g., same frequency and phase) to both sets of layers. More specifically, the first set of layers in FIGS. 5A and 5B include a first electret layer 152, a first electrically conductive layer 158, a first electrically insulative layer 156 and a first plurality of spacers (e.g., 154*a*, 154*b*, 154*c*) between the first electrically conductive layer 158 and the first electret layer 152. Similarly, the second set of layers includes a second electret layer 162, a second electrically conductive layer 168, a second electrically insulative layer 166 and a second plurality of spacers (e.g., 164*a*, 164*b*, 164*c*) disposed between the second electrically conductive layer 168 and the second electret layer 162. In an embodiment, the haptic actuator 150 may comprise only the first set and the second set of layers. In another embodiment, the haptic actuator 150 may comprise additional sets of layers (e.g., a third set of layers, a fourth set of layers, etc.), where the sets of layers are stacked sequentially on top of one another.

FIGS. 5A and 5B further show a signal generating circuit 155 electrically connected to both the first conductive layer 158 and the second conductive layer 168, and not to any of the electret layers 152, 162. As discussed above, the presence of the second set of layers 162-168 may create actuation that supplements the actuation from the first set of layers 152-158. For instance, if the signal generating circuit 155 applies the same oscillating drive signal to the haptic actuator 150 as the signal generating circuit 115 applies to the haptic actuator 110 in FIG. 2A, the haptic actuator 150 may output a vibrotactile haptic effect that has approximately twice the amplitude as that output by the haptic actuator 110.

In an embodiment, any of the electret layers discussed above may have a permanent or quasi-permanent surface charge and have a built-in voltage that creates an internal and/or external electric field that arises from a built-in voltage. In an embodiment, the built-in voltage may come from polar domain orientation in the material of the electret layer (e.g., a dielectric material such as a foamed plastic (e.g., polytetrafluoroethylene (PTFE, or Teflon™), polypropylene, polyethylene terephthalate (PET), polyvinylidene fluoride (PVDF), and their derivatives), silicon dioxide, Parylene™, or any combination thereof); come from extra ions or charge in the material; and/or from trapped ions or charge in the material. Extra charge may be inserted into the surface of a dielectric material of the electret layer by using ion discharge techniques, such as corona discharge. The corona discharge may be considered as a particle accelerator in which positively or negatively charged particles are accelerated toward a target surface to bombard the surface, and can be trapped inside the material. For instance, a dielectric polymeric film can be treated via corona discharge to be permanently charged due to the trapped charge. As a result of the unbalanced induced charges, the dielectric polymeric film can generate an electric field. The direction of the electric field may depend on the nature of the trapped charged particles (e.g., depend on whether they are positively or negatively charged). To increase the charge density and, as a result, the strength of the induced electric field, the dielectric polymeric film can be processed into a foam (preferably open cell) to enable it to trap or otherwise absorb more charged particles.

As discussed above, electret material may also be formed through polar domain orientation. This process may involve processing a polar material in a manner that provides the material with non-random molecular polar domains. This may create oriented molecular dipoles that can generate a net electric field. One way of creating the non-random molecular polar domains involves heating a material to a temperature at which dipoles in the material can freely rotate. Then, a strong external electric field may be applied to the material, and the material may then be allowed to cool in a controlled manner while maintaining the external electric field. As a result, the dipoles may be frozen along a direction of the external electric field, and a net electric field results from the oriented molecular dipoles inside the material.

In an embodiment, if the permanent electric field of an electret layer is from the presence of permanent, trapped charge in the layer, and the electret layer is arranged in a parallel plate configuration with an electrically conductive layer, the electric field may be calculated based on the following formula:

$$E = \frac{Q}{\varepsilon_o A} = \frac{\sigma}{\varepsilon_o} \quad (1)$$

where E is the strength of the electric field, Q is the amount of excess charge trapped in the electret layer, A is an area of the electret layer, σ is a charge density, and $\varepsilon_o$ is the dielectric permittivity constant. When a charge q is induced in the electrically conductive layer via a drive signal, the force of the interaction between the electrically conductive layer and the electret layer may be calculated as:

$$F = Eq = \frac{qQ}{\varepsilon_o A} \quad (2)$$

This calculation may yield both the amount of force that the electret layer and the conductive layer exert on each other. As can be seen, a large value of Q (the amount of extra charge in the electret layer) can compensate for a small value of q (the charge induced by the drive signal) to generate a force which is sufficient for a vibrotactile haptic effect.

The electret-based haptic actuator of the embodiments herein may be used in any context, such as in a gaming, automotive, wearable, virtual reality or augmented reality, or other user interface context.

While various embodiments have been described above, it should be understood that they have been presented only as illustrations and examples of the present invention, and not by way of limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment.

What is claimed is:

1. A haptic actuator, comprising:
   an electret layer having a built-in voltage along a thickness dimension of the electret layer;
   an electrically conductive layer;
   an electrically insulative layer disposed between the electret layer and the electrically conductive layer;
   a plurality of spacers disposed between the electret layer and the electrically conductive layer; and
   a signal generating circuit electrically connected to the electrically conductive layer and not electrically connected to the electret layer, wherein the signal generating circuit is configured to apply an oscillating drive signal to the electrically conductive layer to generate a vibrotactile haptic effect.

2. The haptic actuator of claim 1, wherein the signal generating circuit includes a processor configured to set an amplitude of the oscillating drive signal to be less than the built-in voltage of the electret layer, and wherein the signal generating circuit is configured to generate the oscillating drive signal at the amplitude set by the processor.

3. The haptic actuator of claim 2, wherein the processor is configured to set the amplitude of the oscillating drive signal to be less than 1/10th of the built-in voltage of the electret layer.

4. The haptic actuator of claim 3, wherein the processor is configured to set the amplitude of the oscillating drive signal to be less than 1/100th of the built-in voltage of the electret layer.

5. The haptic actuator of claim 4, wherein the built-in voltage of the electret layer is in a range of between 1 kV and 10 kV, and the processor is configured to set the amplitude of the oscillating drive signal to be in a range of between 1 V and 10 V.

6. The haptic actuator of claim 1, wherein the electrically conductive layer or the electret layer has a resonant vibrating frequency, and wherein the signal generating circuit includes a processor that is configured to set a frequency of the oscillating drive signal to be equal to the resonant vibrating frequency of the electrically conductive layer or of the electret layer, the frequency being in a range of 100 Hz to 500 Hz, and wherein the signal generating circuit is configured to generate the oscillating drive signal at the frequency set by the processor.

7. The haptic actuator of claim 1, wherein the electrically insulative layer has a thickness that is in a range of between 100 microns and 1 mm.

8. The haptic actuator of claim 1, wherein each spacer of the plurality of spacers has a thickness that is in a range of 0.1 mm to 0.5 mm.

9. The haptic actuator of claim 1, wherein the electret layer and the electrically conductive layer have the same dimensions and each forms a rectangle having four sides, wherein each of the sides of the respective rectangles of the electret layer and the electrically conductive layer is in a range between 2 mm and 20 mm.

10. The haptic actuator of claim 1, wherein each spacer of the plurality of spacers has the form of a microdot.

11. The haptic actuator of claim 1, further comprising:
   a second electret layer disposed on the electrically conductive layer;
   a second plurality of spacers disposed on the second electret layer;
   a second electrically insulative layer disposed on the second plurality of spacers;
   a second electrically conductive layer disposed on the second electrically insulative layer,
   wherein the signal generating circuit is electrically connected to the second electrically conductive layer and is not electrically connected to the second electret layer.

12. A haptic-enabled device, comprising:
   a housing forming an outer surface of the haptic-enabled device;
   a haptic actuator disposed at the outer surface of the haptic-enabled device, wherein the haptic actuator comprises,
      an electret layer having a built-in voltage along a thickness dimension of the electret layer,
      an electrically conductive layer,
      an electrically insulative layer disposed between the electret layer and the electrically conductive layer, and
      a plurality of spacers disposed between the electret layer and the electrically conductive layer; and
   a signal generating circuit electrically connected to the electrically conductive layer of the haptic actuator and not electrically connected to the electret layer of the haptic actuator, wherein the signal generating circuit is configured to apply an oscillating drive signal to the electrically conductive layer to generate a vibrotactile haptic effect at the outer surface of the haptic-enabled device.

13. The haptic-enabled device of claim 12, further comprising:
   a display screen housed in the housing, the display screen also forming the outer surface of the haptic-enabled device, wherein the haptic actuator is disposed on the display screen, and wherein the electret layer, the electrically insulative layer, and the electrically conductive layer of the haptic actuator are transparent.

14. The haptic-enabled device of claim 12, wherein the signal generating circuit comprises a processor configured to set an amplitude of the oscillating drive signal to be less than $\frac{1}{10}$th of the built-in voltage of the electret layer, and wherein the signal generating circuit is configured to generate the oscillating drive signal at the amplitude set by the processor.

15. The haptic-enabled device of claim 14, wherein the processor is configured to set the amplitude of the oscillating drive signal to be less than $\frac{1}{100}$th of the built-in voltage of the electret layer.

16. The haptic actuator of claim 1, wherein the plurality of spacers create a space that is between the electret layer and the electrically conductive layer as well as between the plurality of spacers, wherein at least one of the electret layer or the electrically conductive layer is suspended by the plurality of spacers over the space, and wherein the oscillating drive signal causes the electret layer and the electrically conductive layer to generate the vibrotactile haptic effect by alternating between moving toward each other and away from each other within the space created by the plurality of spacers.

17. The haptic actuator of claim 1, wherein the plurality of spacers are disposed between the electrically insulative layer and one of the electrically conductive layer or the electret layer.

18. The haptic actuator of claim 1, wherein a surface area of the electrically insulative layer is the same as a surface area of the electrically conductive layer.

19. The haptic actuator of claim 1, wherein the plurality of spacers are disposed at respective corners of the electrically conductive layer.

20. The haptic actuator of claim 19, wherein the plurality of spacers include four spacers disposed at four respective corners of the electrically conductive layer.

* * * * *